United States Patent
Di Pietro et al.

(10) Patent No.: US 9,305,265 B2
(45) Date of Patent: Apr. 5, 2016

(54) METHOD AND SYSTEM FOR PROBABILISTIC PROCESSING OF DATA USING A BIT MATRIX, TUPLES, AND HASH VALUES

(75) Inventors: Andrea Di Pietro, Heidelberg (DE); Felipe Huici, Dossenheim (DE); Saverio Niccolini, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 980 days.

(21) Appl. No.: 13/498,943

(22) PCT Filed: Sep. 29, 2010

(86) PCT No.: PCT/EP2010/005942
§ 371 (c)(1),
(2), (4) Date: Jul. 17, 2012

(87) PCT Pub. No.: WO2011/038899
PCT Pub. Date: Apr. 7, 2011

(65) Prior Publication Data
US 2012/0271940 A1 Oct. 25, 2012

(30) Foreign Application Priority Data
Sep. 29, 2009 (EP) ..................... 09012319

(51) Int. Cl.
*G06F 17/00* (2006.01)
*G06N 7/00* (2006.01)
*H04L 29/06* (2006.01)

(52) U.S. Cl.
CPC ............ *G06N 7/005* (2013.01); *H04L 63/0227* (2013.01)

(58) Field of Classification Search
CPC ... H04L 63/0227; H04L 45/745; G06N 7/005
USPC ............................................... 706/12, 45, 62
See application file for complete search history.

(56) References Cited

U.S. PATENT DOCUMENTS

| 6,212,184 | B1 * | 4/2001 | Venkatachary et al. ...... 370/392 |
| 7,865,608 | B1 * | 1/2011 | Schuba et al. ................ 709/231 |
| 2009/0228433 | A1 * | 9/2009 | Aguilar Saborit et al. ....... 707/2 |
| 2010/0285790 | A1 * | 11/2010 | Baliosian et al. .......... 455/422.1 |

FOREIGN PATENT DOCUMENTS

JP 2009-065413 A 3/2009

OTHER PUBLICATIONS

JP OA dated Jul. 3, 2013, from corresponding Japanese patent application No. 2012-531281.
International Search Report dated Feb. 11, 2011, corresponding to PCT/EP2010/005942.
D. Guo, et al.; "Theory and Network Applications of Dynamic Bloom Filters"; Apr. 1, 2006; pp. 1-12.

* cited by examiner

*Primary Examiner* — David Vincent
(74) *Attorney, Agent, or Firm* — Young & Thompson

(57) ABSTRACT

A method for probabilistic processing of data, wherein the data is provided in form of a data set S composed of multidimensional n-tuples of the form $(x_1, \ldots, x_n)$, is characterized in that an n-dimensional data structure is generated by way of providing a bit matrix, providing a number K of independent hash functions $H_k$ that are employed in order to address the bits in the matrix, and inserting the n-tuples $(x_1, \ldots, x_n)$ into the bit matrix by computing the hash values $H_k(x)$ for all values x of the n-tuple for each of the number K of independent hash functions $H_k$, and by setting the resulting bits $[H_k(x_1), \ldots, H_k(x_n)]$ of the matrix. Furthermore, a respective system is disclosed.

18 Claims, 2 Drawing Sheets

METHOD AND SYSTEM FOR PROBABILISTIC PROCESSING OF DATA USING A BIT MATRIX, TUPLES, AND HASH VALUES

The present invention relates to a method and a system for probabilistic processing of data, wherein said data is provided in form of a data set S composed of n-tuples of the form $(x_1, \ldots, x_n)$.

BACKGROUND OF THE INVENTION

Probabilistic data structures in general, and Bloom Filters (BFs) in particular, are nowadays used in a wide variety of important network applications, thanks to their ability to summarize large amounts of information in a compact way while still allowing fast queries and updates. BFs (see for reference Bloom, B. H. "Space/time trade-offs in hash coding with allowable errors", in Communications of the ACM, vol. 13, no. 7, July, 1970, p. 422-426) are used both to store local information which needs fast lookups (e.g. for routing, filtering, monitoring, deep packet inspection DPI, intrusion detection systems IDS, etc.) and to export data. In distributed databases or peer-to-peer systems BFs are often used to efficiently export summaries of the resources available on each node.

However, standard BFs only support membership queries, and are therefore not expressive enough for many applications. An extension to BFs called Counting Bloom Filters (henceforth CBF), as described for instance in L. Fan, P. Cao, J. Almeida, and A. Z. Broder, "Summary Cache: A Scalable Wide-Area (WEB) Cache Sharing Protocol", in IEEE/ACM Transactions on Networking, 8 (3):281-293, 2000 provides a more flexible data structure that can support item deletion and approximate counting. In C. Estan and G. Varghese, "New Directions in Traffic Measurement and Accounting", in Proceedings of the 1st ACM SIGCOMM Workshop on Internet Measurement a similar data structure is used for detecting flows passing a certain threshold. However, while BF summaries generated by multiple sources can be easily aggregated with no information loss by performing a bit-wise "or", CBFs are not linear with respect to aggregation, thus making them less appealing for many network applications.

Other solutions have been proposed to enhance the expressiveness of BFs in order to essentially use them as packet counters (see for instance M. Durand and P. Flajolet, "Loglog counting of large cardinalities," in ESA03, volume 2832 of LNCS, 2003, pp. 605-617). However, these solutions are still based on a "flat" one dimensional key space and cannot be used, for example, to take trace of relationships among tuples (e.g., correlating packets belonging to different flows but the same application). Further, they do not support distinct counting, in that they cannot avoid the same packet to be accounted for several times; the same holds true for other data structures, such as sketches, which are commonly used for various network applications, or, more particularly, counting sketches, which are used to summarize large vectors of data.

Finally, in Muhammad Mukarram Bin Tariq, "Tuple Set Bloom Filter", Georgia Tech., presentation Apr. 26, 2006 the author proposes a solution to use a BF-based data structure which supports approximate tuple queries with undefined attributes. The approach uses a bit matrix in which each row is associated with one of the attributes of the tuple. Upon each element insertion, a different set of K-independent hash functions is selected out of a total set H, using it to set the bits of the map on each row as in a standard Bloom Filter. Upon membership query, a particular lookup matrix is used and the hash value issued by every function in H is computed over the input attribute values. The query returns a positive result if K hash functions exist that address a set bit on each row. In order to perform wildcard queries, the rows associated with the undefined attributes can be simply skipped. This data structure, however, does support neither a cardinality estimation query nor a threshold trespassing query. Moreover, it can return only a Boolean value as a response and is thus not suitable for counting.

It is therefore an object of the present invention to improve and further develop a method and a system for probabilistic processing of data of the initially described type in such a way that an efficient summary of data is realized while at the same time a high expressiveness with regard to the kinds of queries that can be performed on the data is provided.

SUMMARY OF THE INVENTION

In accordance with the invention, the aforementioned object is accomplished by a method comprising the features of claim 1. According to this claim, such a method is characterized in that an n-dimensional data structure is generated by way of providing a bit matrix, providing a number K of independent hash functions $H_k$ that are employed in order to address the bits in said matrix, and inserting said n-tuples $(x_1, \ldots, x_n)$ into said bit matrix by computing the hash values $H_k(x)$ for all values x of said n-tuple for each of said number K of independent hash functions $H_k$, and by setting the resulting bits $[H_k(x_1), \ldots, H_k(x_n)]$ of said matrix.

Furthermore, the above-mentioned object is accomplished by a system comprising the features of claim 14. According to this claim, such a system is characterized in that the system includes an input/output element for receiving said n-tuples, a processing element for generating a n-dimensional data structure by way of providing a bit matrix, providing a number K of independent hash functions $H_k$ that are employed in order to address the bits in said matrix, and inserting said n-tuples $(x_1, \ldots, x_n)$ into said bit matrix by computing the hash values $H_k(x)$ for all values x of said n-tuple for each of said number K of independent hash functions $H_k$, and by setting the resulting bits $[H_k(x_1), \ldots, H_k(x_n)]$ of said matrix, and storing element for storing said bit matrix.

According to the invention it has been recognized that the above mentioned objective can be accomplished by introducing a novel data structure that can be regarded as a multidimensional Bloom Filter, which in the following, when referring to the two-dimensional case, is briefly denoted as 2 dBF. A 2 dBF provides a statistic summary of a set S of tuples $(x_1, x_2) \in S$, (or $(x_1, \ldots, x_n) \in S$ in the general n-dimensional case), where each tuple is accounted for only once and $x_1$, $x_2$ (or $x_1, \ldots, x_n$, respectively) represent the values of any kind of involved data (or keys in peer-to-peer related notation). The system according to the present invention includes an input/output element for receiving said n-tuples, a processing element for generating the n-dimensional data structure and a storing element for storing the resulting bit matrix.

The data structure employed according to the present invention is a probabilistic data structure that, due to its design and construction, inherits the same favorable properties as Bloom Filters such as the ability to summarize data efficiently and perform fast lookups. However, at the same time it provides much more expressiveness with regards to the kinds of queries that can be performed on it. The method and the system according to the present invention support wildcard queries and approximate unique count of the multiplicity of the items. In addition, the data structure can also be used to detect whether the approximate count associated with any given item has passed a given threshold ("blind" threshold trespassing), with no need for specifying a set of keys to check for. Furthermore, such data summary supports lossless aggregation: the aggregation of the data structure computed over sets S1 and S2 is equal to a data structure calculated over the union of S1 and S2. In addition, multiple insertions of the same tuple do not affect the estimated cardinalities, since they only result in setting the same bit again: distinct counting is thus implicitly implemented.

The above mentioned queries extend the expressiveness of a traditional Bloom Filter and allow supporting a wider set of networking application. A standard Bloom Filter can only answer membership queries for specific tuples (without allowing for wildcards) and provide an estimation of the overall number of entries By leveraging 2 dBFs it is possible, for example, to gather data summaries from different measurement points in order to detect scanners (by looking for hosts contacting a wide set of distinct addresses). Furthermore, 2 dBFs can be used for the purpose of estimating network traffic matrices by correlating the number of flows per ingress and egress points.

To summarize, the present invention provides a method and a system for compressing multidimensional data structures while preserving properties such that wildcard queries, threshold detection queries and unique count queries can be conducted very fast and deliver almost the same result as on the original data structure. The method works by addressing a multidimensional bitmap using the results of independent hash functions. With respect to prior art solutions for unique counting the present invention is advantageous in that it inhibits the ability to obtain a counter per-key instead of a single aggregate counter as well as the ability to combine different wildcard queries. With respect to prior art tuple-query bloom filters the present invention is advantageous in that it inhibits the ability to estimate cardinality as well as the ability to detect threshold trespassing.

According to a preferred embodiment it may be provided that the bit matrix, in a two-dimensional case, includes a number M of rows and a number N of columns, wherein the numbers M and N are adapted to the cardinality of the possible values x of the n-tuples of said data set S. In other words, M and N are chosen according to the multiplicity of the values (i.e., the number of distinct values) of the two keys/entries $x_1$ and $x_2$. By doing so, the false positive probability inherent in Bloom Filters can be favorably tuned.

By using the input/output element various queries can be directed to the system. To this end the input/output element may be configured to receive the respective queries and to forward them to the processing element. Due to the specific design of the data structure according to the present invention that provides a probabilistic summary of a data set S, in particular plain membership queries, simple and/or compound wildcard queries, and/or threshold trespassing queries are supported as will be describe in detail in the following.

For instance, a plain membership query of an n-tuple $(x_1, \ldots, x_n)$ may be performed as follows:

First, the hash values $H_k(x)$ for all values x of said n-tuple for each of said number K of independent hash functions $H_k$ is computed. Secondly, it is analyzed whether all bits of the matrix in positions $[H_k(x_1), \ldots, H_k(x_n)]$ for each of said number K of independent hash functions $H_k$ are set. If all of the bits in positions $[H_k(x_1), \ldots, H_k(x_n)]$ for each of said number K of independent hash functions $H_k$ are set this means that the n-tuple is contained in the data set with a high probability and the system may return a "true". Otherwise, the n-tuple is definitively not contained in the data set und the system may return a "false".

On the other hand, a simple wildcard query of an n-tuple including a determined value $x_i$ in one dimension only may be performed as follows:

First, the hash values $H_k(x_i)$ for the determined value $x_i$ of said n-tuple for each of said number K of independent hash functions $H_k$ is computed. Secondly, the bitmap $B_{xi}$ is computed as the logical "or" of the K bitmaps $[H_k(x), m]\ \forall k \in 1 \ldots K, m \in 1 \ldots M$. If at least K bits are set in $B_{xi}$, this means that an n-tuple including value $x_i$ is contained in the data set with a high probability and the system may return a "true". Otherwise, definitively no n-tuple including value $x_i$ is contained in the data set und the system may return a "false".

As already mentioned above, the proposed data structure not only allows for simple wildcard queries of the form $(*, x_2) \in S$ (in the 2d case), but also for compound or composed wildcard queries, for instance of the form $(*, x_2) \cap (*, x_1) \cup (x_3, *) \in S$.

According to a preferred embodiment a compound wildcard query is performed by first calculating the bitmaps $B_{xi}$ (as described above) returned by all of the simple queries the compound wildcard query is composed of, and, after that, by computing an aggregate bitmap by means of bit-wise operations among them. In particular, a set-intersection operator may be mapped to a logical "and", and a set-union may be mapped to a logical "or". If at least K bits are set in the resulting global bitmap the query may return a positive result.

In order to explain how the remaining queries can be performed, some considerations about bitmap $B_{xi}$ have to be noted. It is simple to notice that such bitmap is in fact a one dimensional Bloom Filter summarizing the set $S_{xi} = \{x_i$ such that $x_1, x_i) \in S\}$. Such bitmap can be returned by both a compound and a simple wildcard query and can be used to perform further processing.

Based on such a bitmap, cardinality queries over the sets of tuples satisfying both compound and simple wildcard conditions can be answered. Due to the probabilistic nature of the data structures involved, the returned result will be an estimate of the cardinality, and hence will involve an estimation error. Well-known theoretical analysis can prove that the cardinality of the set summarized by a Bloom Filter can be estimated based on the overall number of non-set bits. Such a property can be leveraged in order to make an estimate of the cardinality of $S_{xi}$. However, the presence of additional set bits due to collisions with other rows and/or columns generally causes the classical estimation formula to overestimate the actual cardinality. Despite this, a novel estimator that takes such collisions into account could be developed.

By leveraging these same principles, threshold trespassing queries of the form $$\exists x_i \text{ such that } \|(*, x_1)\| > \text{threshold}$$

can be answered as well. It can be noticed that, by construction, each row in the matrix accounts for at most $1/K$ of the bits that are set in the final bitmap (K being the number of independent hash functions used). This is of course a conservative estimate, since the set bits on the different rows could overlap. It is then assumed that the bitmap $B_{xi}$ associated to a set $S_{xi}$, whose cardinality overcomes the defined threshold, must have at least $N_{thresh}$ bits set. As a consequence, each of the rows $$[H_k(x_1), m] \forall k \in 1 \ldots K, m \in 1 \ldots M$$

must have at least $N_{thresh}/K$ bits set, and the threshold trespassing event can be detected as follows:

First, the number $N_{thresh}$ of set bits associated with the defined threshold according to a standard (one-dimensional) Bloom Filter formula is calculated. Since the estimator has zero mean, that involves taking some confidence interval into account. Next, for each row of the resulting bit matrix it is checked whether more than $N_{thresh}/K$ bits are set. If at least K rows satisfy the condition above, a positive result will be returned, i.e. the defined threshold is exceeded.

The types of queries supported by a 2 dBF data structure according to the present invention, which have been explained above, turn out to be useful in the context of various network monitoring applications, in particular those which need to aggregate information summaries regarding different traffic sources while still being able to discard different observations of the same event.

A simple example of this kind of application is detection of a malicious host performing a scan: in this case the monitoring application has to look for a source address which is associated with many distinct destination addresses. It is assumed that a set of probes has been deployed through the network to be monitored and that the goal of a central monitoring application is to spot addresses which are trying to initiate connections with a large number of different hosts on the network. In this case, several packets are likely to be monitored by more than one probe, and so the application should make sure that it does label as scanners those addresses whose packets are captured more than once. More specifically, the reports from each probe have to be aggregated in a way that allows both discarding of duplicate measurements and accounting of the different addresses scanned by each external host. In this use case, the proposed data structure of the present invention could be used by each monitoring probe to export a summary of the observed origin-destination pairs. The reports can be aggregated with no information loss and it is possible, depending on the deployment conditions, both to check the number of addresses scanned by a set of already suspicious hosts (by using a cardinality query) or to just to check whether any address is likely to be performing a scan (by making a threshold trespassing check).

Another simple use case of a 2 dBF structure is traffic matrix monitoring: by using two separate 2 dBF data structures keeping track of flows passing through each ingress and egress points respectively and by performing a compound wildcard query, an estimate of the number of flows for a given origin-destination pair can be returned.

Yet another exemplary application is VoIP anomaly detection: a 2 dBF can be used to separately keep track of users, and for each, the outgoing calls they make. A cardinality count can then be used to identify a source as an attacker or telemarketer (i.e., an unusual number of outgoing calls).

BRIEF DESCRIPTION OF THE DRAWINGS

There are several ways how to design and further develop the teaching of the present invention in an advantageous way. To this end it is to be referred to the patent claims subordinate to patent claims 1 and 14 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing

DETAILED DESCRIPTION OF THE PREFERRED EMBODIMENTS

Figure 1:
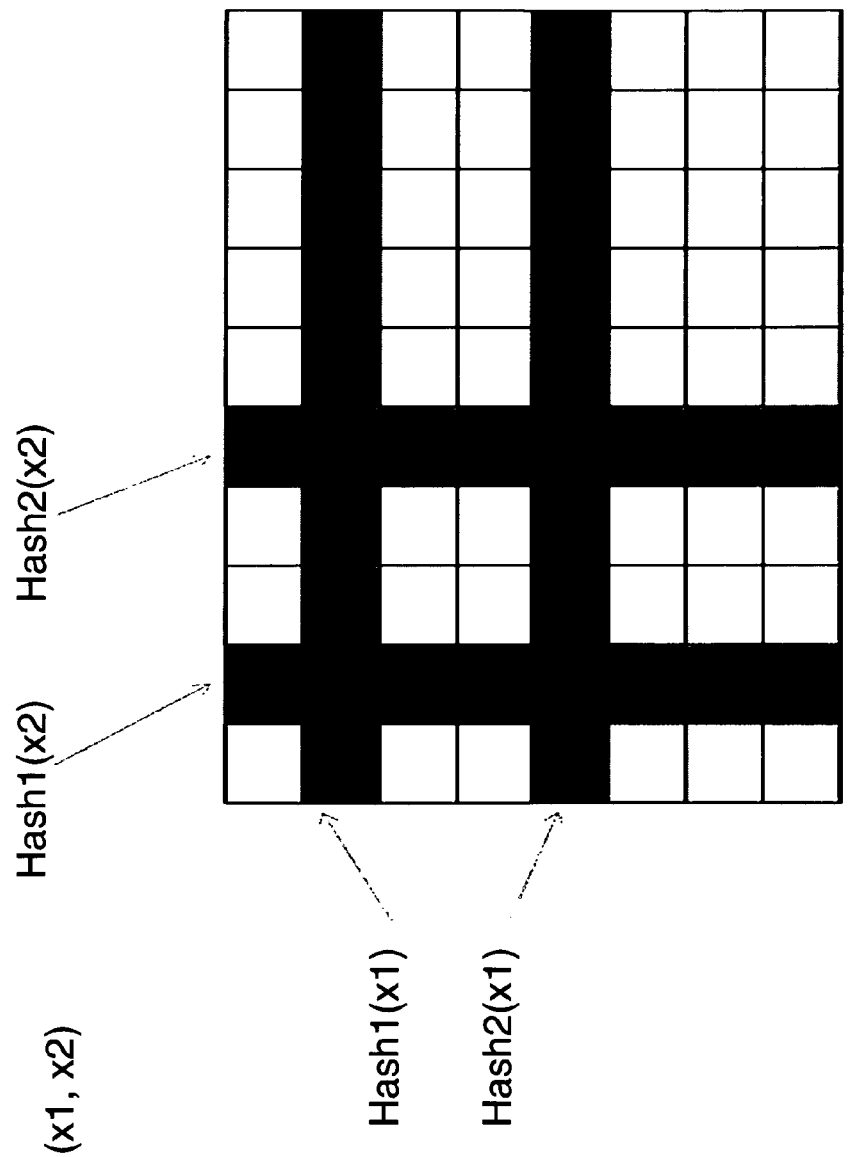
FIG. 1 is a schematic view illustrating insertion and membership query in a two-dimensional Bloom Filter data structure according to an embodiment of the present invention.

FIG. 1 illustrates by way of example the deployment of a two-dimensional Bloom Filter (in the following denoted briefly 2 dBF) data structure that relies on an M by N bit matrix. M and N are integer values that are chosen according to the cardinality of the possible values of $x_1$ and $x_2$ (which of course depend on the respective application scenario and which are typically known or can be least estimated in advance). By adapting the size of the bit matrix to the cardinality of the possible values that are being processed, the false positive probability inherent in bloom filters can be tuned.

The embodiment illustrated in FIG. 1 is a simplified example with K=2, K referring to the number of independent hash functions that are used in order to address the bits within the matrix. The simplification was made in order to explain the basic functional principle of the method according to the present invention; however, as will be apparent to a skilled person, in real-world applications the number of independent hash functions addressing the bits within the matrix will be much higher.

Upon insertion of a new tuple $(x_1, x_2)$, the K independent hash functions are computed over both fields of the pair and the relevant set of bits within the M×N matrix are set. When performing a tuple lookup, the same hash values are computed and the bits in the same positions are checked: if all of them are set, the query returns a positive value.

In detail, in FIG. 1, the procedure for the insertion of a new tuple $(x_1, x_2)$ works as follows: First, the hash values $H_k(x)$ for both $x_1$ and $x_2$ and for every hash function $H_k$ (here $H_1$ and $H_2$ only) are computed. Based on the results, the bits in the positions $$[H_k(x_1), H_k(x_2)] \forall k \in 1 \ldots K$$

are set.

The procedure for a membership lookup of a tuple $(x_1, x_2)$, works as follows: First, the hash values $H_k(x)$ for both $x_1$ and $x_2$ and for every hash function $H_k$ (here again $H_1$ and $H_2$ only) are computed. If all of the bits in positions $$[H_k(x_1), H_k(x_2)] \forall k \in 1 \ldots K$$

are set, a "true" is returned, which means that the tuple $(x_1, x_2)$ is contained in the data structure at least with a high probability (taking into consideration the false positive probability). Otherwise, i.e. in case only a single one of the relevant bits is not set, a "false" is returned, which means that the tuple $(x_1, x_2)$ is definitively not contained in the data structure.

As will be explained in connection with FIG. 2, a 2 dBF also supports wildcard queries returning information about the set of tuples matching $(x_1, *)$. In that case, the hash values calculated over $x_1$ are used to select a set of K rows of the matrix. By performing a bit-wise "or" of such rows, a bit map is obtained that provides a statistical summary of all the tuples satisfying the wildcard query. Based on such a bitmap, the number of such tuples can be estimated, and an intersection or union with other subsets can be performed; the estimation is done by leveraging the well-known relation between the number of non-set bits in a BF and the cardinality of the associated set. This mechanism implicitly implements distinct counting, as multiple insertions of the same tuple do not affect the global result.

In addition, by taking advantage of the relation between the number of set bits in a row and the number of set bits in the final aggregated bitmap, it is possible, just by examining each row in the matrix, to determine whether an item/key $x_1$ exists such that the cardinality of its associated wildcard set goes over a given threshold.

Figure 2:
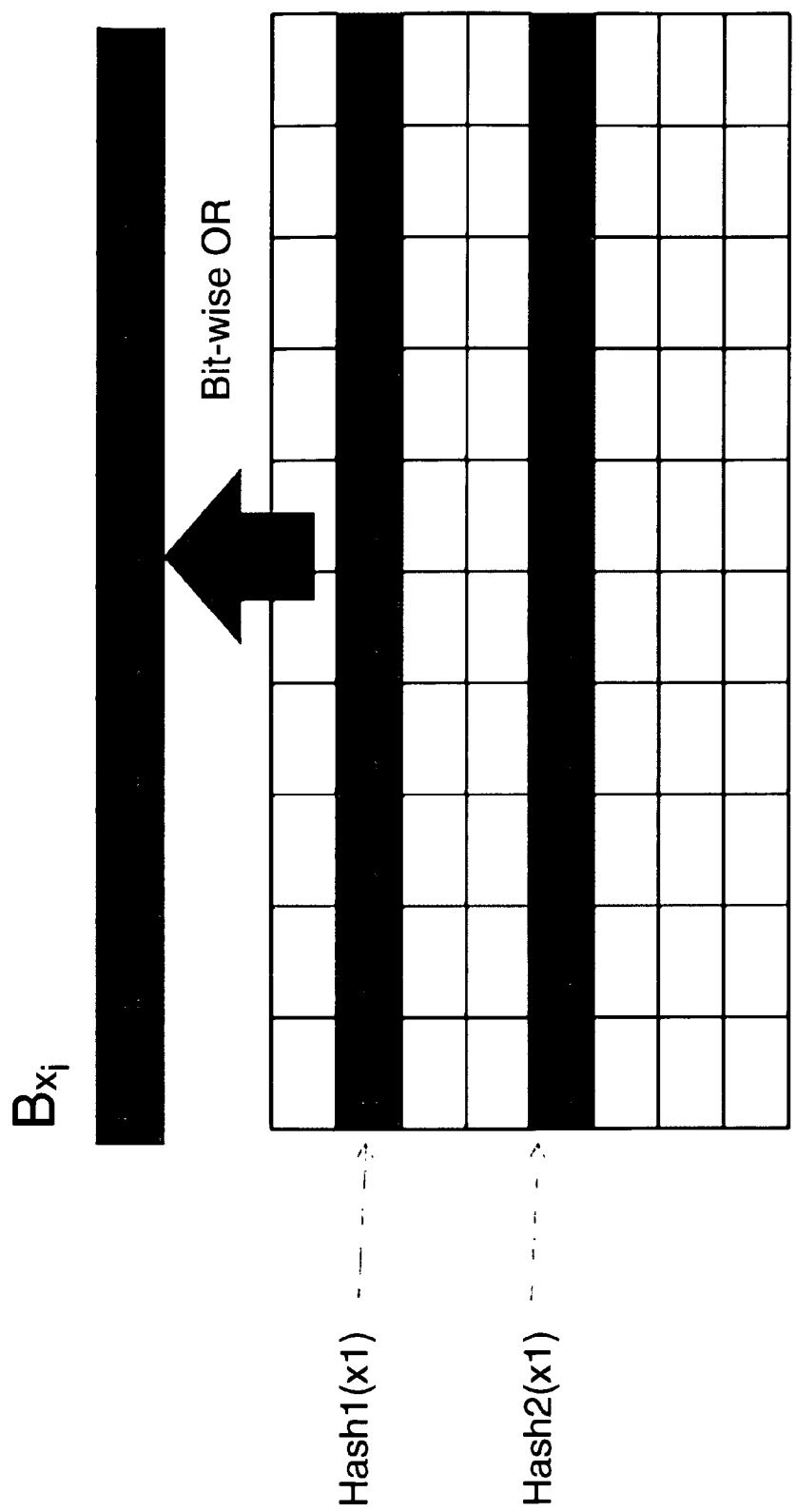
FIG. 2 is a schematic view illustrating a wildcard query in a two-dimensional Bloom Filter data structure according to another embodiment of the present invention.

In detail, FIG. 2 is related to the same M×N bit matrix as FIG. 1, and again, for the purpose of simplification, an embodiment is chosen in which only tow independent hash functions are employed. The embodiment of FIG. 2 illustrates a simple wildcard query $(x_1, *)$, which is performed as follows: First, the hash values $H_k(x_1)$ are computed for every hash function $H_k$ (here $H_1$ and $H_2$ only). In a next step, based on the results the bitmap $Bx_1$ is computed as the logical "or" of the K (here K=2) bitmaps $$[H_k(x_1), m] \forall k \in 1 \ldots K, m \in 1 \ldots M$$

determined in the first step. If in the bitmap $Bx_1$ thus calculated at least K bits (i.e. 2 bits in the embodiment of FIG. 2) are set, a "true" will be returned. In the illustrated scenario, since a total of 7 bits is set, this means that the value $x_1$—in form of a tuple of the form $(x_1, *)$—is contained in the data structure at least with a high probability (taking into consideration the false positive probability). Otherwise, a "false" would be returned, which means that there is definitively no tuple of the form $(x_1, *)$ contained in the data structure.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for probabilistic processing of data to be carried out by a processing element in communication with a storing element and an input/output element for receiving said data, wherein said data is provided in form of a data set S composed of multidimensional n-tuples of the form $(x_1, \ldots, x_n)$, the processing element being provided with instructions sufficient to cause the processing element, upon execution of said instructions, to:
   generating an n-dimensional data structure by way of
      providing a bit matrix,
      providing a number K of independent hash functions $H_k$ that are employed in order to address the bits in said matrix, and
      inserting said n-tuples $(x_1, \ldots, x_n)$ into said bit matrix by computing the hash values $H_k(x)$ for all values x of said n-tuple for each of said number K of independent hash functions $H_k$, and by setting the resulting bits $[H_k(x_1), \ldots, H_k(x_n)]$ of said matrix,
   wherein said bit matrix includes a number M of rows and a number N of columns,
   wherein a simple wildcard query, of an n-tuple including a determined value $X_i$ in one dimension only, is performed by way of
      computing the hash values $H_k(x_i)$ for the determined value $x_i$ of said n-tuple for each of said number K of independent hash functions $H_k$, and
      computing the bitmap $B_{xi}$ as the logical "or" of the K bitmaps $[H_k(x), m] \forall k \in 1 \ldots K, m \in 1 \ldots M$, and
   wherein a compound wildcard query is performed by way of
      calculating said bitmaps $B_{xi}$ of all simple wildcard queries said compound wildcard query is composed of, and
      computing an aggregated bitmap by means of bit-wise operations among said bitmaps $B_{xi}$.

2. The method according to claim 1, wherein the numbers M and N are adapted to the cardinality of the possible values x of said n-tuples of said data set S.

3. The method according to claim 1, wherein a plain membership query of an n-tuple $(x_1, \ldots, x_n)$ is performed by way of
   computing the hash values $H_k(x)$ for all values x of said n-tuple for each of said number K of independent hash functions $H_k$, and
   analyzing whether all bits of said matrix in positions $[H_k(x_1), \ldots, H_k(x_n)]$ for each of said number K of independent hash functions $H_k$ are set.

4. The method according to claim 3, wherein an output "true" is returned in case all bits of said matrix in positions $[H_k(x_1), \ldots, H_k(x_n)]$ for each of said number K of independent hash functions $H_k$ are set.

5. The method according to claim 1, wherein output "true" is returned in case at least a number of K bits are set in said bitmap $B_{xi}$.

6. The method according to claim 1, wherein a set-interaction operator is mapped to a logical "and" operation.

7. The method according to claim 1, wherein a set-union operator is mapped to a logical "or" operation.

8. The method according to claim 1, wherein output "true" is returned in case at least a number of K bits are set in said aggregated bitmap.

9. The method according to claim 1, wherein, based on said bitmaps $B_{xi}$, cardinality queries over sets of n-tuples satisfying both simple and compound wildcard conditions are answered.

10. The method according to claim 1, wherein threshold trespassing events are detected by way of
    defining a threshold,
    calculating a number $N_{thresh}$ of set bits associated with said defined threshold according to a one-dimensional Bloom Filter,
    for each row of said bit matrix checking whether more than $N_{thresh}/K$ bits are set.

11. The method according to claim 10, wherein output "true" is returned in case at least a number of K rows of said bit matrix include more than $N_{thresh}/K$ set bits.

12. A system for probabilistic processing of data, the system comprising:
    an input/output element for receiving data is provided in the form of a data set S composed of multidimensional n-tuples of the form $(x_1, \ldots, x_n)$;
    a processing element for generating a n-dimensional data structure by way of providing a bit matrix, providing a number K of independent hash functions $H_k$ that are employed in order to address the bits in said matrix, and inserting said n-tuples $(x_1, \ldots, x_n)$ into said bit matrix by computing the hash values $H_k(x)$ for all values x of said n-tuple for each of said number K of independent hash functions $H_k$, and by setting the resulting bits $[H_k(x_1), \ldots, H_k(x_n)]$ of said matrix; and
    a storing element for storing said bit matrix,
    wherein the processing element is in communication with a non-transitory data medium having recorded thereon instruction code readable by said processing element and sufficient to cause the processing element, upon execution by the processing element, to carry out the function of generating an n-dimensional data structure by way of
providing a bit matrix,
providing a number K of independent hash functions $H_k$ that are employed in order to address the bits in said matrix, and
inserting said n-tuples $(x_1, \ldots, x_n)$ into said bit matrix by computing the hash values $H_k(x)$ for all values x of said n-tuple for each of said number K of independent hash functions $H_k$, and by setting the resulting bits $[H_k(x_1), H_k(x_n)]$ of said matrix,
wherein said bit matrix includes a number M of rows and a number N of columns,
wherein a simple wildcard query, of an n-tuple including a determined value $x_i$ in one dimension only, is performed by way of
computing the hash values $H_k(x_i)$ for the determined value $x_i$ of said n-tuple for each of said number K of independent hash functions $H_k$, and
computing the bitmap $B_{xi}$ as the logical "or" of the K bitmaps $[H_k(x), m] \forall k \in 1 \ldots K, m \in 1 \ldots M$, and
wherein a compound wildcard query is performed by way of
calculating said bitmaps $B_{xi}$ of all simple wildcard queries said compound wildcard query is composed of, and
computing an aggregated bitmap by means of bit-wise operations among said bitmaps $B_{xi}$.

13. The system according to claim 12, wherein said input/output element is configured to receive plain membership queries, simple and/or compound wildcard queries, and/or threshold trespassing queries.

14. A network, comprising:
a plurality of network probes that are deployed through said network, said network probes performing network packet monitoring by observing the origin address and the destination address of packets; and
a monitoring application being configured to receive monitoring reports from said network probes, wherein said monitoring reports include a summary of the pairs of origin address and destination address observed by the respective network probes,
wherein said network probes and said monitoring application are configured to employ the method according to claim 1 for generating and/or querying said summary.

15. The method according to claim 2, wherein a plain membership query of an n-tuple $(x_1, \ldots, x_n)$ is performed by way of
computing the hash values $H_k(x)$ for all values x of said n-tuple for each of said number K of independent hash functions $H_k$, and
analyzing whether all bits of said matrix in positions $[H_k(x_1), \ldots, H_k(x_n)]$ for each of said number K of independent hash functions $H_k$ are set.

16. The method according to claim 5, wherein a compound wildcard query is performed by way of
calculating said bitmaps $B_{xi}$ of all simple wildcard queries said compound wildcard query is composed of, and
computing an aggregated bitmap by means of bit-wise operations among said bitmaps $B_{xi}$.

17. The method according to claim 6, wherein a set-union operator is mapped to a logical "or" operation.

18. The system according to claim 12, further comprising:
a monitoring application configured to receive and process monitoring reports from a plurality of network probes deployed on a network, said network probes configured to perform network packet monitoring on packets traversing the network and generate monitoring reports by observing an origin address and a destination address of the packets,
wherein said monitoring reports include a summary of the pairs of origin address and destination address observed by the respective network probes, and
wherein said summary is generated and/or queried by way of the n-dimensional data structure.

* * * * *